United States Patent
Fischer

(10) Patent No.: US 6,802,494 B1
(45) Date of Patent: Oct. 12, 2004

(54) WIRE RETRIEVER SYSTEM

(76) Inventor: Klaus Fischer, 4810 163 Ave. North, Clearwater, FL (US) 33762

( * ) Notice: Subject to any disclaimer, the term of this patent is extended or adjusted under 35 U.S.C. 154(b) by 146 days.

(21) Appl. No.: 10/211,753

(22) Filed: Aug. 2, 2002

(51) Int. Cl.$^7$ .............................................. B63B 35/03

(52) U.S. Cl. .............................................. 254/134.3 R

(58) Field of Search ................. 254/134.3 R, 134.3 FT, 254/134.7; 294/19.1, 26; 81/177.85

(56) References Cited

U.S. PATENT DOCUMENTS

| | | | | |
|---|---|---|---|---|
| 3,182,960 A | * | 5/1965 | French ..................... | 254/134.7 |
| 3,891,188 A | * | 6/1975 | Peirce, Jr. ............ | 254/134.3 R |
| 5,458,317 A | * | 10/1995 | Caracofe et al. ...... | 254/134.3 R |
| 6,499,778 B2 | * | 12/2002 | Boulay ................. | 254/134.3 R |

* cited by examiner

Primary Examiner—Robert C. Watson
(74) Attorney, Agent, or Firm—Edward P. Dutklewicz

(57) ABSTRACT

A wire retriever system comprises a handle with an interior portion. The handle has an open end and a pair of apertures. The apertures are adjacent to the open end. The receiving end has a pair of apertures. These apertures are adjacent to the circular apertures. Wire retaining members are provided. The retaining members have a cylindrical configuration. Each retaining member has a working end with an aperture and a coupling end having conical recesses. The retaining members are adapted to fit in the handle. A sleeve is provided. The sleeve has a cylindrical configuration with a second pair of apertures. A pair of ball bearings is provided. The ball bearing are in a spherical configuration. Provided last is a solid cylinder. The cylinder is adapted to pass through the apertures of the sleeve and the apertures of the handle.

5 Claims, 4 Drawing Sheets

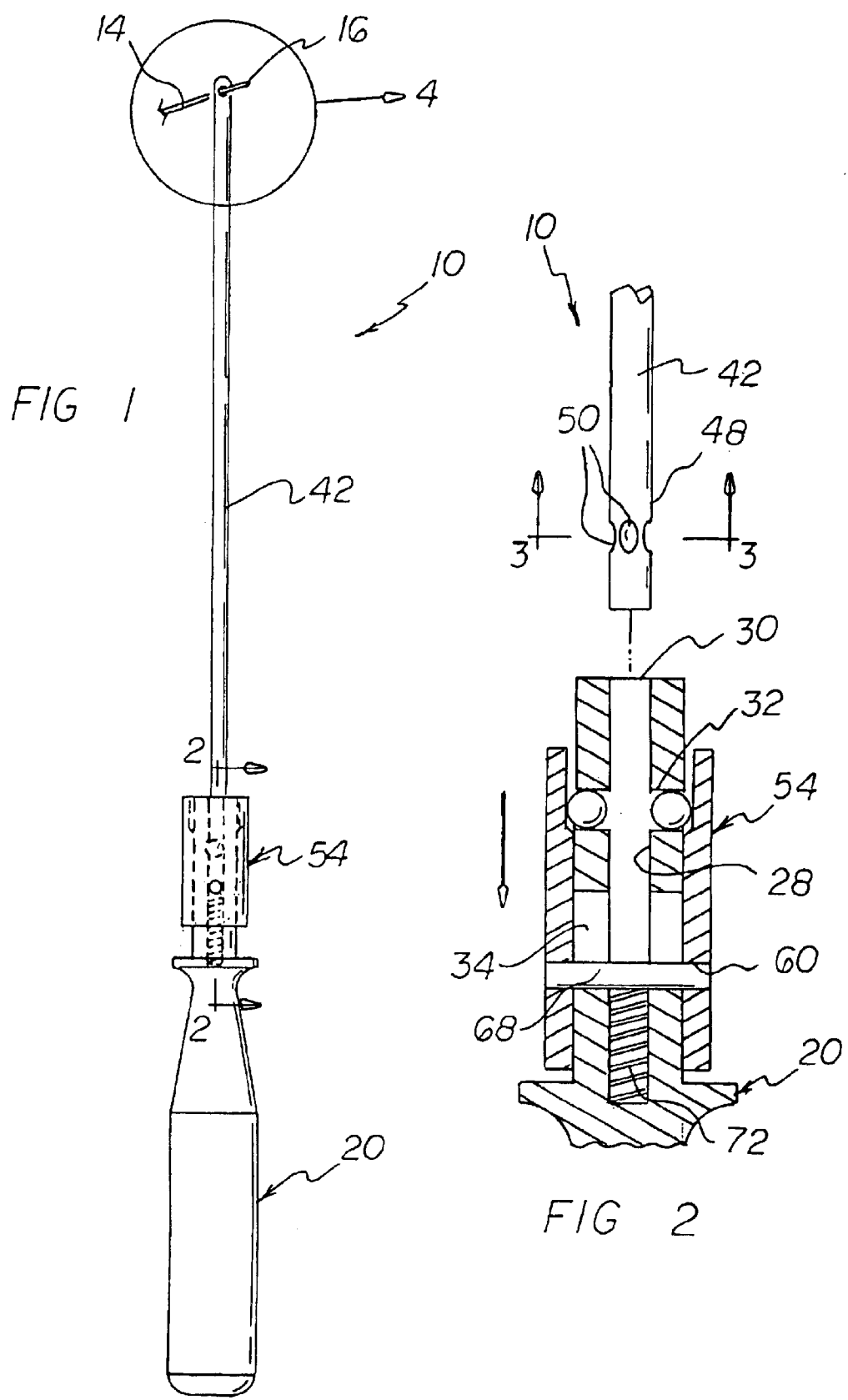

WIRE RETRIEVER SYSTEM

BACKGROUND OF THE INVENTION

1. Field of the Invention

The present invention relates to a wire retriever system and more particularly pertains to guiding electrical wires through relatively inaccessible openings.

2. Description of the Prior Art

The use of wire handlers of known designs and configurations is known in the prior art. More specifically, wire handlers of known designs and configurations previously devised and utilized for the purpose of guiding wires through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,887,855 to Whitney et al discloses an electronics installation hand tool system. U.S. Pat. No. 3,896,534 to Kaufman et al discloses an electrical wire inserting tool. U.S. Pat. No. 5,265,326 to Scribner discloses a wire insertion hand tool for the insertion of wires, or similar strand-like material, within a wire containing duct. U.S. Pat. No. 5,458,317 to Caracofe et al. discloses a cable tool. U.S. Pat. No. 4,854,546 to Vea discloses a cable installation and placement implement. U.S. Pat. No. 4,386,800 to Segall discloses a tool for pulling cable. U.S. Pat. No. 4,054,264 to Elversson discloses a tool for moving a long flexible leading wire through hollow passages. U.S. Pat. No. 2,727,721 to Pinkerton discloses a conductor wire guide. Finally, U.S. Pat. No. 6,044,733 to Liu discloses a screwdriver having a retractable and flexible shank. While these devices fulfill their respective, particular objectives and requirements, the aforementioned patents do not describe a wire retriever system that allows guiding electrical wires through relatively inaccessible openings.

In this respect, the wire retriever system according to the present invention substantially departs from the conventional concepts and designs of the prior art, and in doing so provides an apparatus primarily developed for the purpose of guiding electrical wires through relatively inaccessible openings.

Therefore, it can be appreciated that there exists a continuing need for a new and improved wire retriever system which can be used for guiding electrical wires through relatively inaccessible openings. In this regard, the present invention substantially fulfills this need.

SUMMARY OF THE INVENTION

In view of the foregoing disadvantages inherent in the known types of wire handlers of known designs and configurations now present in the prior art, the present invention provides an improved wire retriever system. As such, the general purpose of the present invention, which will be described subsequently in greater detail, is to provide a new and improved wire retriever system and method which has all the advantages of the prior art and none of the disadvantages.

To attain this, the present invention essentially comprises a wire. The wire has at least one free end. A handle is provided. The handle has a generally cylindrical configuration with a receiving end, a distal end and a central portion there between. The receiving end has a cylindrical configuration. The receiving end also has a cylindrical hollow interior portion. The interior portion has a first diameter and an open end. The receiving end further has a pair of circular apertures. The apertures are adjacent to the open end and are lying directly opposed to each other. The receiving end further has a pair of generally cylindrical apertures. These apertures are adjacent to the circular apertures and are also lying directly opposed to each other and parallel with the receiving end. The distal end has a cylindrical portion. The cylindrical portion is adapted to be held in the hand of a user. The cylindrical portion has a frustoconical region and a lip portion. Provided next is a plurality of wire retaining members. The wire retaining members have a cylindrical configuration. The wire retaining members have a second diameter. The second diameter is equal to the first diameter. Each retaining member has a working end with an aperture. Each aperture is adapted to receive the free end of the wire. A coupling end is provided. The coupling end has four conical recesses. The conical recesses are equally spaced there around. The recesses have a first circumference. The wire retaining members are adapted to fit in the hollow interior portion of the receiving end of the handle. Further provided is a sleeve. The sleeve has a cylindrical configuration with an external end, an internal end and an open central cylindrical portion. The sleeve is adapted to slide over the receiving end of the handle. The sleeve has a second pair of circular apertures. The circular apertures are opposed to each other. The central portion has a third diameter equal to the first and second diameter. The central portion has a recessed region of a fourth diameter. The recessed region is adjacent to the external end. The fourth diameter is larger than the first, second and third diameter. A pair of ball bearings is provided. The ball bearings are of a spherical configuration. The ball bearings have a second circumference. The second circumference is equal to the first circumference of the recesses of the wire retaining member and being adapted to reside in the circular apertures of the handle. The ball bearings have a first position when the sleeve is pulled toward the handle. In this manner the recessed region of the sleeve is allowed to lie adjacent to the circular apertures of the handle allowing the wire retaining member to be positioned within the hollow interior portion of the handle without obstruction by the ball bearings. A second position where in the sleeve being in a rest position and holding the ball bearings into the conical recesses of the wire retaining members allows the wire retaining member in to be held in place. Even further provided is a solid cylinder. The solid cylinder is adapted to pass through the circular apertures of the sleeve and the cylindrical apertures of the receiving end of the handle. In this manner the sleeve is adapted to slide between the first position and the second position in a uniform manner. Provided last is a spring. The spring is positioned in the cylindrical hollow interior portion adjacent to the central portion of the handle. The spring provides a biasing to the sleeve such that the sleeve remains in the second position until the user moves the sleeve into the first position when changing the wire retaining members.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wire retriever system which has all of the advantages of the prior art wire handlers of known designs and configurations and none of the disadvantages.

It is another object of the present invention to provide a new and improved wire retriever system which may be easily and efficiently manufactured and marketed.

It is further an object of the present invention to provide a new and improved wire retriever system which is of durable and reliable constructions.

An even further object of the present invention is to provide a new and improved wire retriever system which is susceptible of a low cost of manufacture with regard to both materials and labor, and which accordingly is then susceptible of low prices of sale to the consuming public, thereby making such wire retriever system economically available to the buying public.

Even still another object of the present invention is to provide a wire retriever system for guiding electrical wires through relatively inaccessible openings.

Lastly, it is an object of the present invention to provide a new and improved wire retriever system comprises a handle with an interior portion. The handle has an open end and a pair of apertures. The apertures are adjacent to the open end. The receiving end has a pair of apertures. These apertures are adjacent to the circular apertures. Wire retaining members are provided. The retaining members have a cylindrical configuration. Each retaining member has a working end with an aperture and a coupling end having conical recesses. The retaining members are adapted to fit in the handle. A sleeve is provided. The sleeve has a cylindrical configuration with a second pair of apertures. A pair of ball bearings is provided. The ball bearing are in a spherical configuration. Provided last is a solid cylinder. The cylinder is adapted to pass through the apertures of the sleeve and the apertures of the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the wire retrieving system constructed in accordance with the principles of the present invention.

FIG. 2 is an enlarged cross sectional view taken at line 2—2 of FIG. 1.

The same reference numerals refer to the same parts throughout the various Figures.

DESCRIPTION OF THE PREFERRED EMBODIMENT

Figure 3:
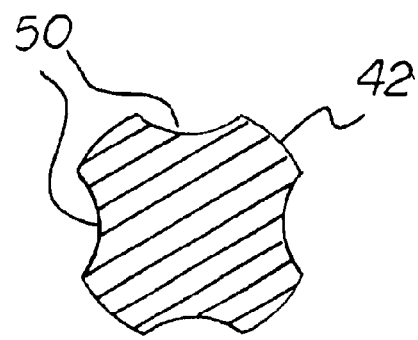
FIG. 3 is a cross sectional view taken along line 3—3 of FIG. 2.
Figures 4, 5:
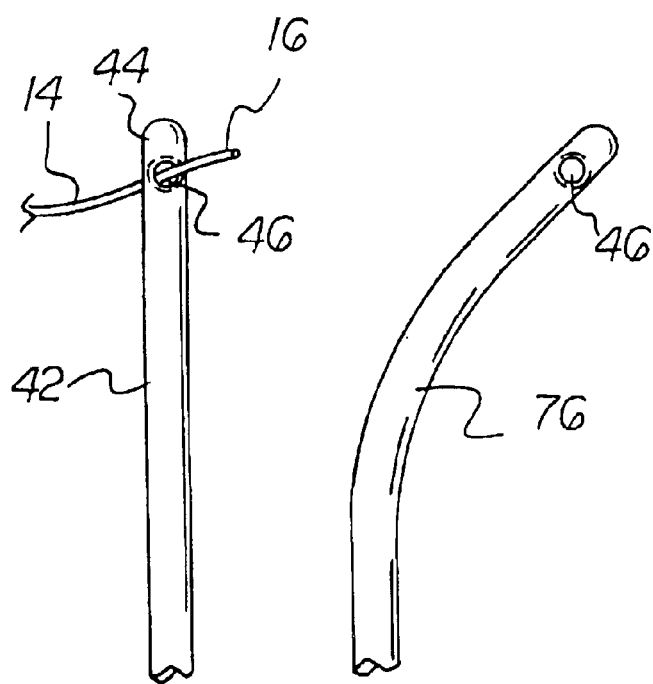
FIGS. 4, 5 and 6 are enlarged views of the ends of the wire retaining members.
Figure 6:
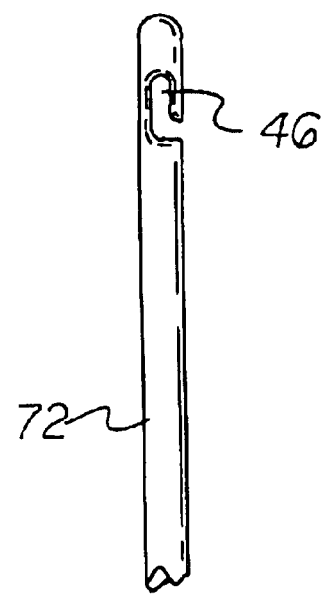
Figure 7:
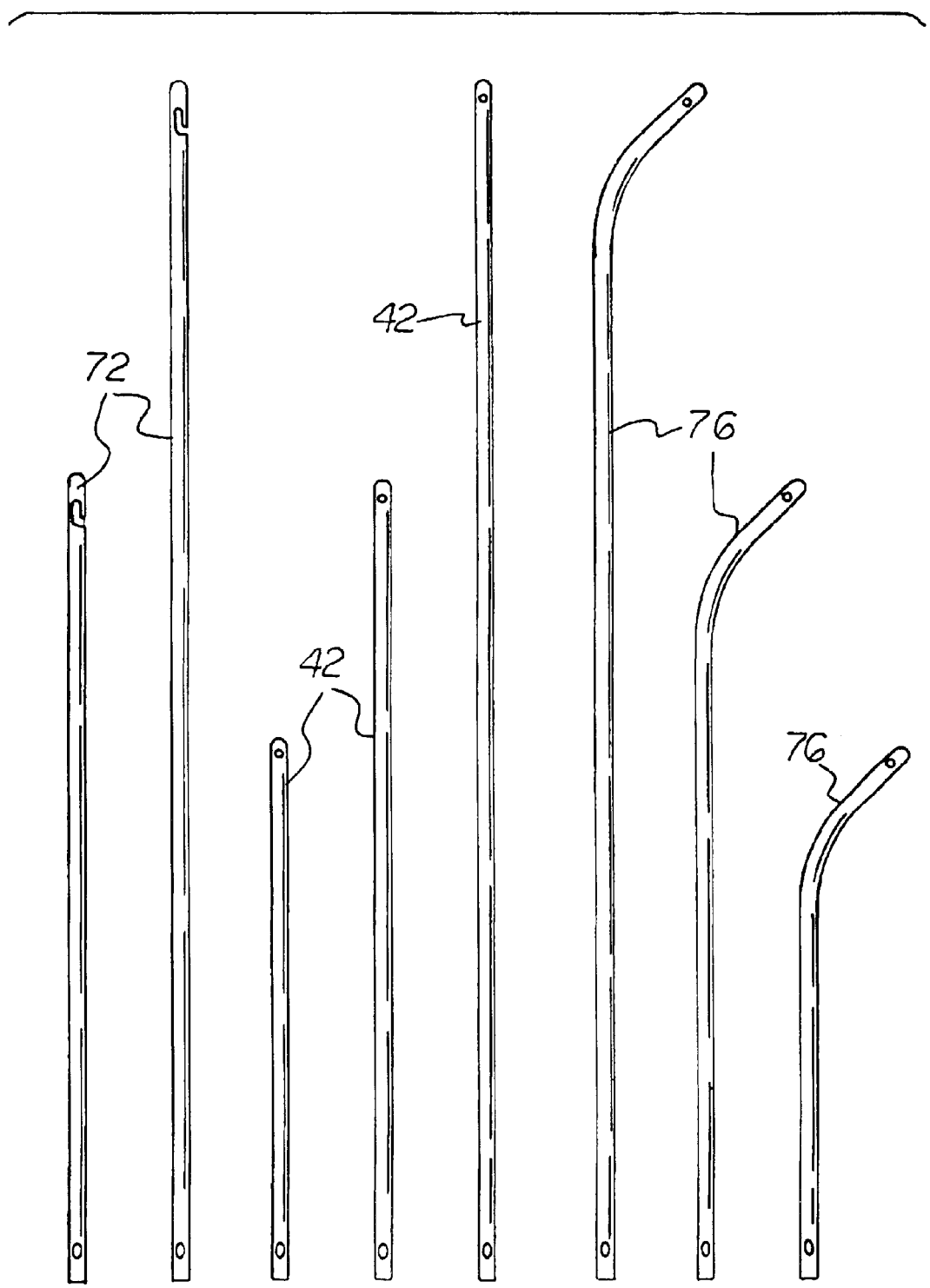
FIG. 7 is side elevational views of a plurality of differently configured wire retaining members.
Figure 8:
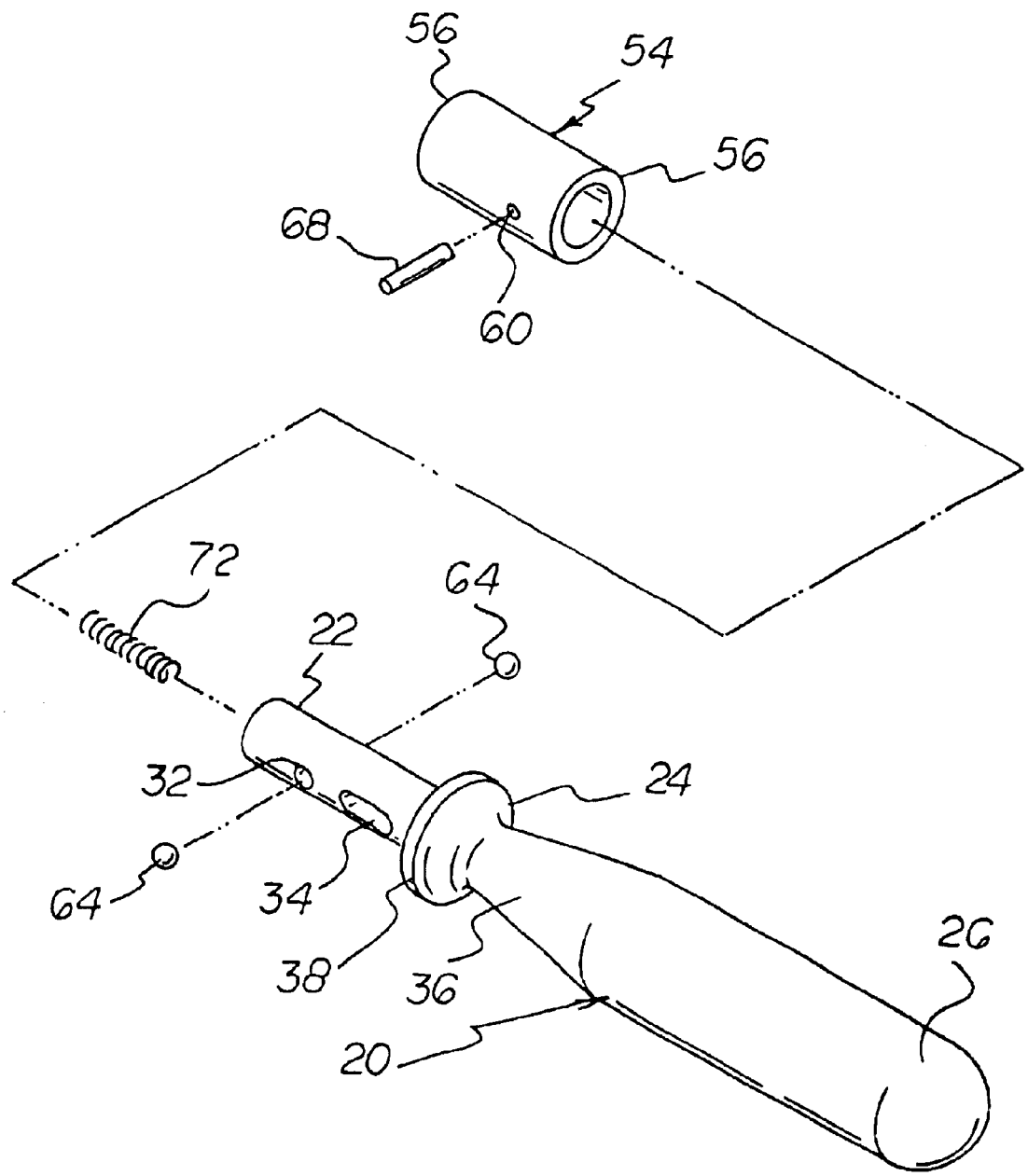
FIG. 8 is an enlarged exploded perspective view of the handle of FIGS. 1 and 2.

With reference now to the drawings, and in particular to FIG. 1 thereof, the preferred embodiment of the new and improved wire retriever system embodying the principles and concepts of the present invention and generally designated by the reference numeral 10 will be described.

The present invention, the wire retriever system 10 is comprised of a plurality of components. Such components in their broadest context include a handle, a plurality of wire retaining members, a sleeve, a pair of ball bearings and a solid cylinder. Such components are individually configured and correlated with respect to each other so as to attain the desired objective.

First provided is a wire 14. The wire has at least one free end 16.

A handle 20 is provided. The handle has a generally cylindrical configuration with a receiving end 22, a distal end 24 and a central portion 26 there between. The receiving end has a cylindrical configuration. The receiving end also has a cylindrical hollow interior portion 28. The interior portion has a first diameter and an open end 30. The receiving end further has a pair of circular apertures 32. The apertures are adjacent to the open end and are lying directly opposed to each other. The receiving end further has a pair of generally cylindrical apertures 34. These apertures are adjacent to the circular apertures and are also lying directly opposed to each other and parallel with the receiving end. The distal end has a cylindrical portion. The cylindrical portion is adapted to be held in the hand of a user. The cylindrical portion has a frustoconical region 36 and a lip portion 38.

Provided next is a plurality of wire retaining members 42. The wire retaining members have a cylindrical configuration. The wire retaining members have a second diameter. The second diameter is equal to the first diameter. Each retaining member has a working end 44 with an aperture 46. Each aperture is adapted to receive the free end of the wire. A coupling end 48 is provided. The coupling end has four conical recesses 50. The conical recesses are equally spaced there around. The recesses have a first circumference. The wire retaining members are adapted to fit in the hollow interior portion of the receiving end of the handle.

Further provided is a sleeve 54. The sleeve has a cylindrical configuration with an external end 56, an internal end 58 and an open central cylindrical portion. The sleeve is adapted to slide over the receiving end of the handle. The sleeve has a second pair of circular apertures 60. The circular apertures are opposed to each other. The central portion has a third diameter equal to the first and second diameter. The central portion has a recessed region of a fourth diameter. The recessed region is adjacent to the external end. The fourth diameter is larger than the first, second and third diameter.

A pair of ball bearings 64 is provided. The ball bearings are of a spherical configuration. The ball bearings have a second circumference. The second circumference is equal to the first circumference of the recesses of the wire retaining member and being adapted to reside in the circular apertures of the handle. The ball bearings have a first position when the sleeve is pulled toward the handle. In this manner the recessed region of the sleeve is allowed to lie adjacent to the circular apertures of the handle allowing the wire retaining member to be positioned within the hollow interior portion of the handle without obstruction by the ball bearings. A second position where in the sleeve being in a rest position and holding the ball bearings into the conical recesses of the wire retaining members allows the wire retaining member in to be held in place.

Even further provided is a solid cylinder 68. The solid cylinder is adapted to pass through the circular apertures of the sleeve and the cylindrical apertures of the receiving end of the handle. In this manner the sleeve is adapted to slide between the first position and the second position in a uniform manner.

Provided last is a spring 72. The spring is positioned in the cylindrical hollow interior portion adjacent to the central portion of the handle. The spring provides a biasing to the sleeve such that the sleeve remains in the second position until the user moves the sleeve into the first position when changing the wire retaining members.

In an alternate embodiment of the invention, some of the retaining members 72 are linear.

In still another embodiment, some of the retaining members 76 are bent.

The present invention has utility when building aircraft, ships, helicopters, tanks or anything where wire is routed through. This tool is used mostly for single wires. Inside an airplane, the wire harnesses are routed through and around specific areas which are clamped with a round or square clamp that come together at a point where a bolt is screwed down to the frame of the airplane which holds the clamp in place. This tool enables a user to push through the clamps without unscrewing them which saves a lot of time. Some clamps are in very difficult places to work and can take up to 4 or 5 hours to open, insert wire, close, and screw down. With this tool, it takes a few seconds. It is like sewing, but with wire. So, once the rod end with the hole is pushed through the one side of the clamp you simply put the wire into the hole a few inches and then pull it through the clamp. Some rods have bends and some are straight at different lengths for ease of application. actually, the rods can be bent to any angle for application. As can be appreciated, this tool can be used, or adapted, for many applications worldwide. It is preferred to have standard handles which may be etched with company name and part number and the like. Also, the rods and the handles need to be colored red or blue. Additionally, with some, they have cork seals which have to be dug out and removed, only to be replaced after the modifications are complete. With this tool, it can be pushed through the cork seal to feed a wire through. The seal will remain intact which is a great help because the sealant has to be hand mixed and you end up wearing most of it.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wire retriever system for guiding electric wires through relatively inaccessible openings comprising, in combination:

a wire having at least one free end;

a handle having a generally cylindrical configuration with a receiving end, a distal end and a central portion there between, the receiving end having a cylindrical configuration with a cylindrical hollow interior portion with a first diameter and an open end, the receiving end further having a pair of circular apertures adjacent to the open end and lying directly opposed to each other with the receiving end also having a pair of generally cylindrical apertures being adjacent to the circular apertures and also lying directly opposed to each other and parallel with the receiving end, the distal end having a cylindrical portion adapted to be held in the hand of a user, the central portion having a frustoconical region and a lip portion;

a plurality of wire retaining members having a cylindrical configuration with a second diameter equal to the first diameter, each retaining member having a working end with an aperture adapted to receive the free end of the wire and a coupling end having four conical recesses equally spaced there around with the recesses having a first circumference, the wire retaining members being adapted to fit in the hollow interior portion of the receiving end of the handle;

a sleeve having a cylindrical configuration with an external end, an internal end and an open central cylindrical portion and being adapted to slide over the receiving end of the handle, the sleeve having a second pair of circular apertures being opposed to each other, the central portion having a third diameter equal to the first and second diameter and having a recessed region of a fourth diameter adjacent to the external end and with the fourth diameter being larger than the first, second and third diameter;

a pair of ball bearings of a spherical configuration having a second circumference equal to the first circumference of the recesses of the wire retaining member and being adapted to reside in the circular apertures of the handle, the ball bearings having a first position when the sleeve is pulled toward the handle allowing the recessed region of the sleeve to lie adjacent to the circular apertures of the handle allowing the wire retaining member to be positioned within the hollow interior portion of the handle without obstruction by the ball bearings, a second position where in the sleeve being in a rest position and holding the ball bearings into the conical recesses of the wire retaining members thereby holding the wire retaining member in place;

a solid cylinder adapted to pass through the circular apertures of the sleeve and the cylindrical apertures of the receiving end of the handle such that the sleeve being adapted to slide between the first position and the second position in a uniform manner; and a spring positioned in the cylindrical hollow interior portion adjacent to the central portion of the handle and providing a biasing to the sleeve such that the sleeve remains in the second position until the user moves the sleeve into the first position when changing the wire retaining members.

2. A wire retriever system comprising:

a handle with a cylindrical hollow interior portion with an open end and a pair of circular apertures adjacent to the open end with a receiving end also having a pair of generally cylindrical apertures being adjacent to the circular apertures;

a plurality of wire retaining members having a cylindrical configuration, each retaining member having a working end with an aperture and a coupling end having conical recesses, the wire retaining members being adapted to fit in the hollow interior portion of the receiving end of the handle;

a sleeve having a cylindrical configuration with a second pair of circular apertures;

a pair of ball bearings of a spherical configuration residing in the circular aperture of the handle; and a solid cylinder adapted to pass through the circular apertures of the sleeve and the cylindrical apertures of the receiving end of the handle.

3. The system as set forth in claim 2 and further including:

a spring in the cylindrical hollow interior portion adjacent to the central portion of the handle and providing a biasing to the sleeve such that the sleeve remains in a second locking position until the user moves the sleeve into a first release position when changing the wire retaining members.

4. The system as set forth in claim 2 wherein some of the retaining members are linear.

5. The system as set forth in claim 2 wherein some of the retaining members are bent.

* * * * *